(12) United States Patent
Bhushan et al.

(10) Patent No.: US 11,247,380 B2
(45) Date of Patent: *Feb. 15, 2022

(54) METHOD FOR GRANULATING PHARMACEUTICAL POWDER

(71) Applicant: STEERLIFE INDIA PRIVATE LIMITED, Bengaluru (IN)

(72) Inventors: Indu Bhushan, Karnataka (IN); Babu Padmanabhan, Bengaluru (IN); Vinay Rao, Karnataka (IN); Vijay Kulkarni, Karnataka (IN); Chetan Chincholi, Karnataka (IN); Radhika Ghike, Karnataka (IN); Raja Ganeshan, Karnataka (IN)

(73) Assignee: STEERLIFE INDIA PRIVATE LIMITED, Bengaluru (IN)

( * ) Notice: Subject to any disclaimer, the term of this patent is extended or adjusted under 35 U.S.C. 154(b) by 95 days.

This patent is subject to a terminal disclaimer.

(21) Appl. No.: 16/373,187

(22) Filed: Apr. 2, 2019

(65) Prior Publication Data

US 2019/0263043 A1    Aug. 29, 2019

Related U.S. Application Data

(63) Continuation of application No. 16/095,306, filed as application No. PCT/IB2017/052334 on Apr. 24, 2017.

(30) Foreign Application Priority Data

Apr. 22, 2016 (IN) .............................. 201641014156
Sep. 26, 2016 (IN) .............................. 201641032763

(51) Int. Cl.
B29C 48/405    (2019.01)
B29C 48/57     (2019.01)
(Continued)

(52) U.S. Cl.
CPC ............ *B29C 48/405* (2019.02); *B29B 7/481* (2013.01); *B29B 7/483* (2013.01); *B29B 7/489* (2013.01);
(Continued)

(58) Field of Classification Search
CPC .......... B29B 7/483; B29B 7/489; B29B 7/94; B29B 7/481; B29B 7/484; B29B 7/845;
(Continued)

(56) References Cited

U.S. PATENT DOCUMENTS 2,615,199 A * 10/1952 Fuller ..................... B29B 7/488
                                                        425/192 R
3,423,074 A *  1/1969 Loomans ................ B29B 7/483
                                                           366/301
(Continued)

*Primary Examiner* — Seyed Masoud Malekzadeh
(74) *Attorney, Agent, or Firm* — Troutman Pepper Hamilton Sanders LLP

(57) ABSTRACT

Methods for granulating a pharmaceutical powder in a single piece of equipment include at least the following: (a) continuously introducing the pharmaceutical powder and a granulating fluid to the single piece of equipment, (b) passing the pharmaceutical powder and the granulating fluid through a granulating zone of the single piece of equipment to form wet granules, (c) passing the wet granules through a drying zone of the single piece of equipment, (d) optionally passing granules through a discharge zone of the single piece of equipment, and (e) continuously discharging the granules from the single piece of equipment where the single piece of equipment is not a fluid bed processor.

28 Claims, 7 Drawing Sheets

(51) Int. Cl.
*B29C 48/64* (2019.01)
*B29B 9/16* (2006.01)
*B29B 7/48* (2006.01)
*B29B 9/06* (2006.01)
*B29B 7/94* (2006.01)
*B29B 9/08* (2006.01)
*B29C 48/04* (2019.01)
*B29C 48/625* (2019.01)
*B29C 48/80* (2019.01)

(52) U.S. Cl.
CPC .......... *B29B 7/94* (2013.01); *B29B 9/06* (2013.01); *B29B 9/08* (2013.01); *B29C 48/57* (2019.02); *B29B 7/482* (2013.01); *B29B 7/484* (2013.01); *B29B 2009/168* (2013.01); *B29C 48/04* (2019.02); *B29C 48/625* (2019.02); *B29C 48/64* (2019.02); *B29C 48/80* (2019.02)

(58) Field of Classification Search
CPC ..... B29B 2009/168; B29B 7/482; B29B 9/06; B29B 9/08; B29B 9/16; B29B 9/065; B29B 9/10; B29C 48/57; B29C 48/405; B29C 48/64; B29C 48/04; B29C 48/625; B29C 48/80; B29C 48/395; B29C 48/40; B29C 48/402; B29C 48/404; B29C 48/41; B29C 48/415; B29C 48/42; B29C 48/425; B29C 48/435; B29C 48/445; B29C 48/49; B29C 48/505; B29C 48/525; B29C 48/43; B29C 48/682; B29C 48/683; B29C 48/65; B29C 48/655; A23P 30/20
See application file for complete search history.

(56) References Cited

U.S. PATENT DOCUMENTS

| | | | | |
|---|---|---|---|---|
| 3,446,485 A * | 5/1969 | Fischer | ................ | B29B 7/483 366/103 |
| 3,458,321 A * | 7/1969 | Stephenson | ............ | A23P 30/20 426/448 |
| 3,618,902 A * | 11/1971 | Brennan, Jr. | ........... | B29C 48/40 366/301 |
| 3,850,414 A * | 11/1974 | Scharer | ................ | B29C 48/64 366/89 |
| 5,679,456 A * | 10/1997 | Sakai | ................ | B29C 48/625 428/340 |
| 6,143,221 A * | 11/2000 | Gurol | ................ | B02C 13/18 264/118 |
| 6,499,984 B1 * | 12/2002 | Ghebre-Sellassie | ........................ | A61K 9/2009 425/135 |
| 6,783,270 B1 | 8/2004 | Padmanabhan | | |
| 7,910,030 B2 | 3/2011 | Remon et al. | | |
| 8,231,375 B2 | 7/2012 | Remon et al. | | |
| 8,287,268 B1 * | 10/2012 | Thomas | ................ | A23K 10/38 425/382.4 |
| 8,946,333 B2 * | 2/2015 | Raman | ................ | B29B 7/482 524/404 |
| 9,011,741 B2 * | 4/2015 | Wildi | ................ | B29C 48/05 264/141 |
| 9,480,281 B1 * | 11/2016 | Thomas | ................ | B29C 48/345 |
| 9,897,375 B2 * | 2/2018 | Thomas | ................ | F26B 5/14 |
| 10,239,233 B2 * | 3/2019 | Padmanabhan | ......... | B29B 7/489 |
| 10,863,765 B2 * | 12/2020 | Thomas | ................ | A23P 30/20 |
| 2001/0055636 A1 * | 12/2001 | Geromini | ................ | A23L 7/17 426/89 |
| 2004/0000069 A1 * | 1/2004 | Gurol | ................ | B29B 13/065 34/592 |
| 2004/0141406 A1 * | 7/2004 | Womer | ................ | B29C 48/53 366/88 |
| 2004/0142081 A1 * | 7/2004 | Durand | ................ | A23L 7/135 426/516 |
| 2005/0031682 A1 | 2/2005 | Escoi et al. | | |
| 2006/0261509 A1 * | 11/2006 | Lustiger | ................ | B29C 48/40 264/143 |
| 2006/0264544 A1 * | 11/2006 | Lustiger | ................ | B29C 48/05 524/284 |
| 2006/0264556 A1 * | 11/2006 | Lustiger | ................ | C08J 5/046 524/451 |
| 2008/0056058 A1 * | 3/2008 | Padmanabhan | ......... | B29C 48/49 366/85 |
| 2008/0159067 A1 | 7/2008 | Hansen et al. | | |
| 2009/0091049 A1 * | 4/2009 | Nielsen | ................ | B01J 2/16 264/12 |
| 2011/0020456 A1 * | 1/2011 | Amminabavi | ....... | A61K 9/2013 424/489 |
| 2011/0042841 A1 * | 2/2011 | Wildi | ................ | B29B 9/06 264/13 |
| 2011/0063940 A1 * | 3/2011 | Padmanabhan | ....... | B29C 48/682 366/82 |
| 2011/0182133 A1 * | 7/2011 | Padmanabhan | ......... | B29B 7/484 366/76.6 |
| 2012/0199675 A1 * | 8/2012 | Kulesa | ................ | B29B 17/0036 241/15 |
| 2013/0065053 A1 * | 3/2013 | Kikuchi | ................ | B29C 48/345 428/402 |
| 2014/0036614 A1 | 2/2014 | Padmanabhan | | |
| 2014/0087044 A1 * | 3/2014 | Wenger | ................ | A23K 20/20 426/465 |
| 2014/0107273 A1 | 4/2014 | Ochiai et al. | | |
| 2014/0110320 A1 * | 4/2014 | Thomas | ................ | A23P 30/20 210/137 |
| 2014/0296359 A1 * | 10/2014 | Hofmann | ................ | B29B 9/065 521/79 |
| 2016/0082640 A1 * | 3/2016 | Padmanabhan | ......... | B29C 48/04 264/8 |
| 2016/0257087 A1 * | 9/2016 | Thomas | ................ | B29C 48/38 |
| 2016/0279828 A1 | 9/2016 | Padmanabhan | | |
| 2017/0087790 B2 * | 3/2017 | Thomas | ................ | A23N 17/005 |
| 2017/0120499 A1 * | 5/2017 | Li | ................ | B29C 48/67 |
| 2017/0258125 A1 * | 9/2017 | Thomas | ................ | B29C 48/30 |

* cited by examiner

| Cross section | ISO-3D-View (wire frame) | Description |
|---|---|---|
|  |  | Melt Formation Element (MFE) |
|  |  | Fractional Kneading Block (FKB) |
|  |  | Continuous Mixing Element (CME) |
|  |  | Eccentric Fractional Mixing Element (EME) |
|  |  | Fractional Mixing Element (FME) |
|  |  | 3Lobe Right hand Screw Element (3RSE) |

| | | |
|---|---|---|
|  |  | 3Lobe Left hand Screw Element (3LSE) |
|  |  | Special Shovel Type Element (SSV) |
|  |  | (Special Shovel to 3RSE) Transition Element (SSV-3RSE) |
| | | Right handed Fractional Kneading Block (RFKB) |
| | | Dynamic Stir Element (3DSA) |
| | | Eccentric Fractional Kneading Block (EKB) |

METHOD FOR GRANULATING PHARMACEUTICAL POWDER

CROSS REFERENCE TO RELATED APPLICATIONS

This application is a continuation of U.S. application Ser. No. 16/095,306 filed Oct. 19, 2018, which is the U.S. National Stage of International Application No. PCT/IB2017/052334, filed Apr. 24, 2017, which was published in English under PCT Article 21(2), which in turn claims the benefit of India patent Application No. 201641014156, filed in India on Apr. 22, 2016, and Indian Patent Application No. 201641032763, filed in India on Sep. 26, 2016. The foregoing references are incorporated by this reference in their entirety.

FIELD OF INVENTION

The present disclosure relates to the field of granulation. More specifically, it relates to a process and a system for granulation of powder materials.

BACKGROUND OF THE INVENTION

Granulation is a process of size enlargement of powder material. In case of solids such as powders, the surface area of the particle is critical in determining the rate of chemical reaction. Chemical reactions are far more likely to occur in fine particles than otherwise. The effect of particle size on dissolution rate is similar to the influence of particle size on the reaction rate. Size and morphology of particles can have direct correlation with a customer's perception of a product and, therefore, the reputation of a manufacturing company. This is particularly true in the case of food products and flavours in which particle size can impact the enjoyment of the product. In pharmaceutical industry, granulation is used to process powders into dosage forms like tablets and capsules. Attributes like Particle Size Distribution (PSD) and morphology of the starting materials (drug substance and excipients) not only affect drug product manufacturing (flowability, blend uniformity, compactibility, etc.), but also the quality of the drug product considerably.

U.S. Pat. Nos. 7,910,030 and 8,231,375 discloses a process using a twin-screw granulator for wet granulation. The disclosed process involves use of an aqueous granulating liquid in a concentration of 7.5% to 8.5% by weight of powder material. The process requires a drying step to remove excess granulating liquid, after the granules are discharged from the twin screw granulator. Therefore, although the process is described as a continuous process, the drying step must be carried out outside the twin screw granulator.

Currently known method of preparation of granules using a continuous twin-screw granulator results in bi-modal or tri-modal particle size distribution, irregular particle shapes, inadequate process control and lack of steady state. There exists a need for process of granulation that is continuous, and that provides symmetrical shaped particles having desirable attributes such as flow and granule strength. More specifically, there is a need for a process of granulation that is continuous and directly provides dry granules having desired particle size distribution, minimizing or rather eliminating, any post processing steps.

Besides, as well known in the art, twin screw processors and processes are quite unpredictable, due to several independent and dependent variables like screw speed, feed rate, barrel temperature, torque, product temperature, residence time, etc and there is still a need to develop accurate solutions for predicting the optimum process parameters or the product attributes of the output. U.S. Pat. No. 6,783,270, US2014/0036614 A1 and US2016/0279828 A1 discuss the fractional geometry of screw elements. However, the optimal utilization of the potential of these elements in various applications for developing or engineering optimized processes to obtain desired product attributes is discussed in detail in the disclosure below.

SUMMARY OF THE INVENTION

A fractional lobe processor is disclosed. The fractional lobe processor comprises:
   a barrel with heating and cooling means having two parallel intersecting bores of equal diameter, wherein the centre distance between the two bores is lesser than the diameter of the bore;
   a shaft coupled with a plurality of screw elements to form a screw within each bore, wherein the screws are intermeshing, and wherein the screws form at least three zones within the barrel, the zones comprising
   an intake zone comprising at least one deep flighted shovel element on each intermeshing screw for receiving a input blend comprising an active substance and an excipient; a granulation zone consisting of only fractional lobe elements, and having a provision for introducing moisture or a binder solution, for granulating the active substance and the excipient;
   an optional, drying zone for drying the wet granules; and
   a discharge zone for discharging the granules;
wherein the granulation zone is located before the discharge zone and after the intake zone;
wherein the drying zone has one or more fractional lobe elements on each shaft; and wherein the granulation zone has a plurality of fractional lobe elements on each shaft.

A method of granulation is also disclosed. The method comprising the steps of:
   a) introducing an input blend comprising an active substance, binder, water and optionally an excipient into the intake zone of a fractional lobe processor;
   b) passing the input blend through the granulation zone consisting of only fractional elements;
   c) conveying the granules through a conveying zone comprising conveying elements towards the exit;
   d) collecting the wet granules and drying them till a loss on drying below 1.5% w/w.

DETAILED DESCRIPTION

Figure 1:
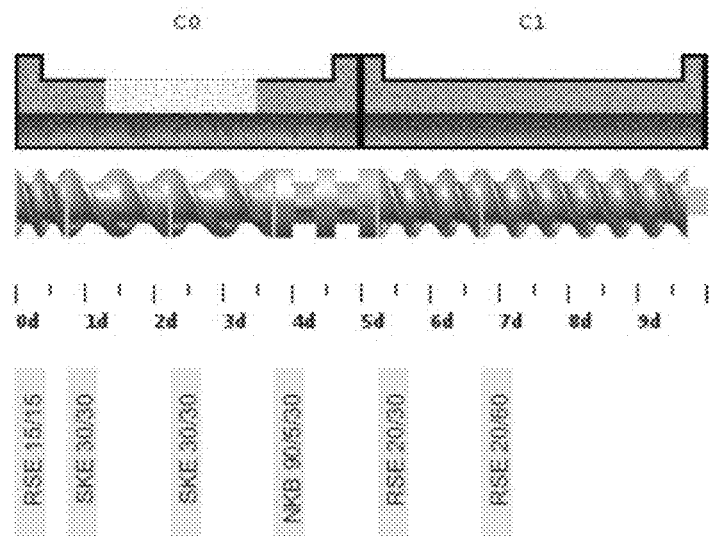
FIG. 1 illustrates screw configuration of a Bi-lobed processor in accordance with Example 4 of the present disclosure.

The present disclosure relates to a fractional lobe processor (FLP) and a process for preparing granules. The fractional lobe processor is a twin screw processor in terms of its screw configuration which is made up of fractional elements in the granulation zone. The granules formed by the fractional lobe processor and the process have critical attributes like ability to flow freely, good compressibility, narrow particle size distribution and optimum strength. The granules are suitable for formulating into pharmaceutical unit dosage forms like tablets and capsules.

The fractional lobe processor comprises mainly of a powder intake zone for receiving a powder material i.e. one or more ingredient(s) and one or more binder(s) and optionally one or more other excipient(s), a fluid intake zone for receiving an optimal quantity of a fluid, a granulation zone for granulating the mixture, and a discharge zone for collecting the granules directly. The discharge zone can be heated to a temperature suitable to dry the wet granular mass, so can be referred to as a drying zone. The drying and discharge zone can be configured to form a single drying and discharge zone. The fluid intake zone can be within the granulation zone wherein the fluid intake zone and granulation zone can be configured to form a single granulation zone. The fluid intake zone can also be referred to as the moisture introduction zone when water containing fluid is introduced.

In a main embodiment, the disclosure relates to a fractional lobe processor comprising
 a. a barrel with heating and cooling means having two parallel intersecting bores of equal diameter, wherein the centre distance between the two bores is lesser than the diameter of the bore;
 b. a shaft coupled with a plurality of screw elements to form a screw within each bore, wherein the screws are intermeshing, and wherein the screws form at least three zones within the barrel, the zones comprising
  i. an intake zone comprising at least one deep flighted shovel element on each intermeshing screw for receiving a input blend comprising an active substance and an excipient;
  ii. a granulation zone consisting of only fractional lobe elements, and having a provision for introducing moisture or a binder solution, for granulating the active substance and the excipient;
  iii. an optional, drying zone for drying the wet granules;
  iv. a discharge zone for discharging the granules;
 wherein the granulation zone is located before the discharge zone and after the intake zone; wherein the drying zone has one or more fractional lobe elements on each shaft; and wherein the granulation zone has a plurality of fractional lobe elements on each shaft.

The intake zone has one or more shovel elements. Besides, the intake zone has one or more pairs of deep flighted shovel elements which aid in intake of feed continuously. The term "deep flighted shovel" can be understood with respect to the elements as per disclosure in US2008/0056058 A1.

The shovel elements are required in the intake zone in the screw configuration having fractional lobe elements which have a greater forward conveying ability. Shovel elements are preferably used in the intake zone to increase the intake capacity of the fractional lobe processor. Special Shovel Type Element (SSV) and Special Shovel-3RSE Transition Element (SSV-3RSE) are a few examples of such shovel elements. The SSV is a tri-lobe type of shovel element used for high volume conveying. The SSV-3RSE is a transition element that is usually used as a bridge between the SSV and the 3RSE elements in the element assembly to provide a smooth flow of material. The screw flights of such elements are designed to plough through the material similar to the working of a snowplough. The shovel elements are required in the intake zone in the screw configuration having fractional lobe elements which have a greater forward conveying ability. Especially in case of powders the shovel elements increase the intake capacity of the processor. The examples of such shovel elements are—Regular Flight Shovel Element (RFV), Single Flight Shovel Element (SFV), Right Handed Shovel Element (RFV), also, some transition elements can be used with shovel elements, such as RFN: Right Handed Transition Element.

The Fractional Lobe Processor has a modular design for barrels and screws. FLP has interchangeable elements, due to which, each individual screw section can be designed to perform specific functions such as; conveying, mixing, granulating thus allowing precise control of conditions along the screw length. For temporal and spatial control, the fractional lobe processor is characteristically made up of different zones through which the feed or material is transferred sequentially. The zones represent sections of the screw configuration designed to perform a specific function like conveying, mixing, granulation and the like. The effectiveness of these specific functions largely depends on geometry of the screw elements and the length of the zones. By proper placement of Fractional Lobe Element(s) [FLE(s)] either individually, or in combination in the processing zone/s of the FLP, it is possible to subject the material to only a specific type of work. The amount of work done on the material can also be manipulated by control on movement of material through carefully crafted screw configuration of the processing zones of the FLP while simultaneously manipulating the screw speed, barrel temperature and barrel length.

The granulation zone comprises one or more Fractional Lobe Element(s) (FLEs). The other zones may also comprise of one or more FLE's. The type of the FLE(s) used depends upon the attributes of the compounded material desired. Examples of the FLE(s) include but are not limited to a Fractional Kneading Block (FKB), a Right handed Fractional Kneading Block (RFKB), Eccentric Fractional Kneading Block (EKB), Fractional Mixing Element (FME), Eccentric Fractional Mixing Element (EME), Continuous Mixing Element (CME), 3Lobe Right hand Screw Element (3RSE), 3Lobe Dynamic Stir Element (3DSA) and Melt Formation Element (MFE).

Figure 8A:
FIGS. 8A and 8B illustrate designs of various types of Fractional Lobe Elements.
Figure 8A:
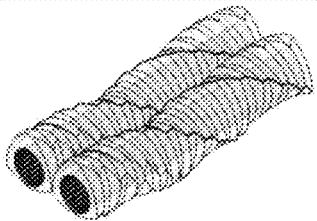
Figure 8A:
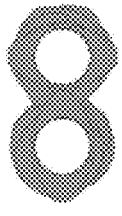
Figure 8A:
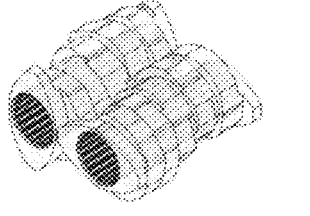
Figure 8A:
Figure 8A:
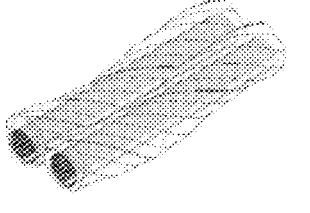
Figure 8A:
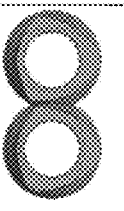
Figure 8A:
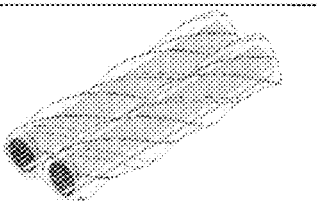
Figure 8A:
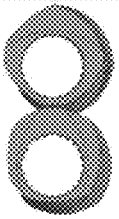
Figure 8A:
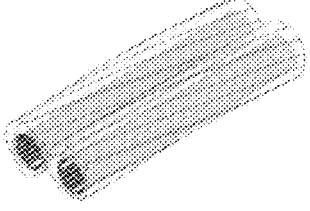
Figure 8A:
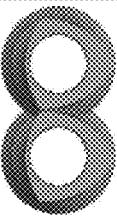
Figure 8A:
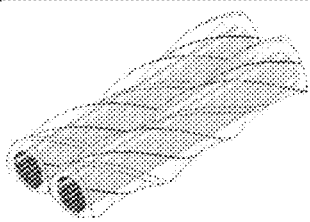
Figure 8B:
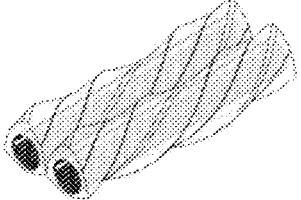
Figure 8B:
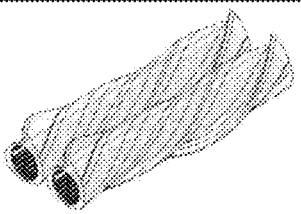
Figure 8B:
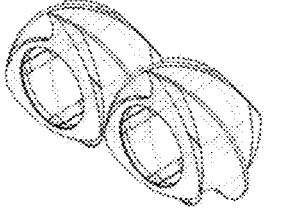
Figure 8B:
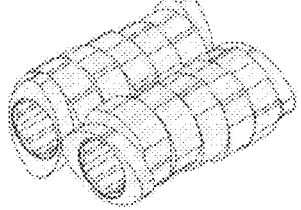
Figure 8B:
Figure 8B:
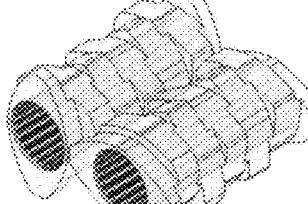

FIGS. 8A and 8B depict designs of the various elements as per the disclosure.

The FKB is a 90° left hand twist kneading block element with fractional segments in middle, with bi-lobed segments on either ends for the ease of assembly. It provides uniform and intense shear. The RFKB is a 90° right hand twist kneading block element with fractional segments in middle, with bi-lobed segments on either ends for the ease of assembly. It provides high smearing action. The EKB is 90° right hand twist kneading block element with bi-lobed segments on either ends for the ease of assembly and eccentric fractional tri-lobe segments in middle. It provides highest level of shear uniformity with low shear intensity. The FME is a fractional four lobed pair element. It is usually used in as set of forward (right hand) and reverse (left hand) element in assembly to form a perfect combination for efficient mixing. The elements have a bi-lobe profile step on one side (outer face of the element in its assembly form) for ease of orientation in assembly. It is characterized by stretching and high amount of reorientation. The FME reduces the effects of meta-radial shear stresses, provides uniform mixing and low shear. The EME is an eccentric fractional tri-lobed element. It is usually used as a set of forward (right hand) and reverse (left hand) element in assembly to form a perfect combination for efficient mixing. The element has a bi-lobe profile step on one side. It provides low shear intensity and uniformity. The CME is a cherry-blossom type fractional five lobed element. It is usually used in as set of forward (right hand) and reverse (left hand) element in assembly to form a perfect combination for efficient mixing. The element has a bi-lobe profile step on one side. It provides high shear intensity and uniformity. It is used for dispersive mixing. The 3RSE is a specially designed (1.3.80 ratio) tri-lobe type of forward conveying element. 3LSE is a specially designed (1.3.80 ratio) tri-lobe type of reverse conveying element. 3DSA is a specially designed (1.3.80 ratio) tri-lobe dynamic stir element promoting forward mixing and conveying. The MFE is a special type of element with the 3DSA segments smoothly twisted along the length for longer leads. It helps in eliminating 90° exposure of segments to solids (as in case of regular kneading elements).

The term "active substance" as used herein means an active pharmaceutical ingredient or the main ingredient of the product of the process.

The term "excipient" as used herein means a substance which can be processed with the active substance in the processor. Unless otherwise mentioned, the term also includes a binder.

The disclosure relates to following main embodiments for the fractional lobe processor—

In an embodiment, the disclosure relates to a fractional lobe processor comprising
a. a barrel with heating and cooling means having two parallel intersecting bores of equal diameter, wherein the centre distance between the two bores is lesser than the diameter of the bore;
b. a shaft coupled with a plurality of screw elements to form a screw within each bore, wherein the screws are intermeshing, and wherein the screws form at least three zones within the barrel, the zones comprising
 i. an intake zone comprising at least one deep flighted shovel element on each intermeshing screw for receiving a input blend comprising an active substance and an excipient;
 ii. a granulation zone consisting of only fractional lobe elements, and having a provision for introducing moisture or a binder solution, for granulating the active substance and the excipient;
 iii. an optional, drying zone for drying the wet granules;
 iv. a discharge zone for discharging the granules;
wherein the granulation zone is located before the discharge zone and after the intake zone;
wherein the drying zone has one or more fractional lobe elements on each shaft; and wherein the granulation zone has a plurality of fractional lobe elements on each shaft.

In an aspect, the disclosure relates to the fractional lobe processor as per above embodiment, wherein from granulation zone to the discharge zone, at least one-fourth of each intermeshing screw comprises of fractional lobe elements.

In an aspect, the disclosure relates to the fractional lobe processor as per above embodiment, wherein from granulation zone to the discharge zone of each intermeshing screw comprises of only fractional lobe elements.

In an aspect, the disclosure relates to the fractional lobe processor as per above embodiment, wherein from granulation zone to the discharge zone of each intermeshing screw comprises a plurality of at least two different fractional lobe elements.

In an aspect, the disclosure relates to the fractional lobe processor as per above embodiment, wherein at least one of the fractional elements in the granulation zone has a first lobe defining a first tip angle, a second lobe defining a second tip angle, and a third lobe defining a third tip angle that is different from the first tip angle and the second tip angle.

In an aspect, the disclosure relates to the fractional lobe processor as per above embodiment, wherein at least one of the fractional elements in the granulation zone has a continuous flight helically formed thereon having a lead 'L', wherein either the flight transforms at least once from an integer lobe flight into a non-integer lobe flight in a fraction of the lead 'L' and transforms back to an integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'.

In an aspect, the disclosure relates to the fractional lobe processor as per above embodiment, wherein at least one of the fractional elements in the granulation zone has a lead 'L' and at least one continuous flight helically formed thereon and, wherein the flight transforms at least once from a first non-integer lobe flight into a second non-integer lobe flight in a fraction of the lead 'L' and transforms back to the first non-integer lobe flight in a fraction of the lead 'L.'

In an aspect, the disclosure relates to a method of granulation comprising the steps of:
 a) introducing an input blend comprising an active substance and/or an excipient into the intake zone of the fractional lobe processor as per above embodiment;
 b) passing the input blend through the granulation zone consisting of only fractional elements, wherein not more than 20% w/w moisture of input blend per minute, is introduced into the blend while processing of the blend with the fractional elements, to form a wet mass;
 c) passing the wet mass through a drying zone, wherein the barrel temperature is set at a temperature of at least two times that of the barrel temperature of the granulation zone;
 d) passing the granules through a discharge zone towards the exit of the barrel;
 e) collecting the granules.

In a further aspect, the disclosure relates to the method as per preceding aspect, wherein the fractional lobe processor has a screw configuration such that the intake zone comprises one or more elements selected from a group consisting of SSV and SSV-3RSE elements and the granulation zone comprises one or more elements selected from a group consisting of 3DSA and FKB.

In a further alternative aspect, the disclosure relates to the method as per preceding aspect wherein the aspect ratio of the granules is in the range from 0.8 to 1.

The processor has an ability to work on the powder material to achieve intimate interaction between the constituents while imparting physico-chemical changes through reaction, de-volatilization, shear, compression, elongation, surface renewal, distribution, dispersion, either alone with minimal interfering effects from other actions, or in any desirable combination of actions. Work imparted by the FLEs provides the required uniformity in a three-dimensional force field eliminating dead spots, or hot zones that could result in material degradation. The processor eliminates meta-radial shear, thus achieving stable and improved process control. The uniform shear imparted by the FLEs in the granulation zone helps to prevent or reduce the degradation or unwanted by-products of the powder material being compounded. The processor provides options of spatial and temporal control over work done on the powder material. There can be qualitative and quantitative control on the work done on the powder material being compounded by varying the FLEs as mentioned above, or process parameters such as screw speed and barrel temperature, or location of the FLEs in the screw configuration. The positioning of the FLE(s) in the granulation zone is advantageous in preventing material stagnation as compared to the integer lobe kneading elements. Besides, the FLEs provide a unique advantage due to their mixing capabilities in compounding of compositions with high drug loading, having minimal amount of excipients; as low as 4% w/w of the composition.

Use of FLEs in the processor provides uniform torque demonstrating a steady state across much wider range of through put. As illustrated by the examples, use of FLEs in the processor contribute towards uniformity of work done on the processed powder material resulting in symmetrical shaped particles having desirable attributes such as flow and granule strength. Absence of hot spots during processing using FLEs results in improved pore diameter and skeletal density of the granules. Improved morphology and other physical attributes of granules results in better control on weight uniformity and friability of tablets prepared from such granules.

Agglomeration and uniform distribution of the fluid occurs simultaneously within the granulation zone. The granulation zone is also responsible for sizing of the granules without requiring a separate milling step.

In accordance with an embodiment, the powder intake zone comprises one or more feeder for receiving one or more ingredient(s), one or more binder(s) and optionally one or more other excipients at different feed rates.

The fluid intake zone comprises an inlet for receiving steam or vapour at high pressure and at a low but constant rate. Steam or vapour can be introduced at a rate of 2.5% to 4% w/w of input blend per minute.

In accordance with an embodiment, the fluid intake zone comprises an inlet for receiving liquid at a low but constant rate. Examples of the liquid include water or solvent or mixture thereof. A suitable apparatus such as a peristaltic pump can be used to introduce the liquid into the fluid intake zone of the processor. In accordance with an embodiment, the liquid is introduced at a rate of 1% to 20% w/w of input blend per minute. In accordance with a specific embodiment, the liquid is introduced at a rate of 2% to 5% w/w of input blend per minute. In accordance with a specific embodiment, the liquid is introduced at a rate of 5% to 10% w/w of input blend per minute. In accordance with a specific embodiment, the liquid is introduced at a rate of 10% to 15% w/w of input blend per minute.

In accordance with an embodiment, the powder intake zone and the fluid intake zone may be configured as a single intake zone. The single intake zone can have separate inlets for receiving the powder material and the liquid.

In accordance with an embodiment, the powder intake zone and the fluid intake zone intake zone may be configured as a single intake zone.

In accordance with an embodiment, barrel temperature of the processor is less than 70° C. while carrying out the granulation. In accordance with an embodiment, barrel temperature of the processor is less than 50° C. while carrying out the granulation. In accordance with a specific embodiment, the barrel temperature of the processor is about 30° C. while carrying out the granulation.

In accordance with an embodiment, the processor further comprises a moisture absorbent intake zone for receiving moisture absorbing excipient(s), a mixing zone for mixing the moisture absorbing excipient(s) with the granules from the granulation zone. A side feeder can be installed for introducing the moisture absorbing excipient(s) into the processor. The moisture absorbing excipient(s) can be selected from microcrystalline cellulose, silicon dioxide or a combination thereof. The moisture absorbing excipient(s) may be added in an amount of about 5% to 30% w/w, preferably about 10% to 20% w/w.

In accordance with an embodiment, the processor further comprises one or more intermediate transition zone(s) between various zones of the processor, such as between the feed intake and the granulation zone, or between the granulation zone and the discharge zone. In an example, the intermediate transition zone(s) is a conveying zone.

In an example, the processor is a co-rotating twin screw extruder without a die at the exit. In accordance with an embodiment, the processor has a length to diameter ratio less than 60. The length to diameter ratio of the processor can be changed to customize it for a granulation process. The screw configuration can be changed to obtain product with particle size distribution or other characteristics as desired. The screw configuration can be such that both the screws have all elements with fractional geometry, or half or more than half length of each screw has elements with fractional geometry, or at least one third of the length of each screw has elements with fractional geometry. Such different screw configurations lead to granules with differences in granule characteristics.

The processor can be provided with elements that ensure that, there is no material stagnation and that, residence time of the compounded material is reduced.

In an embodiment, the process comprises feeding one or more ingredient(s) and one or more binder(s) in the processor, introducing an optimal quantity of fluid through the fluid intake zone, sufficient to granulate the mixture but not to over-wet it, granulating the mixture within the granulation zone using high and uniform shear forces and directly obtaining granules from the processor.

With a twin screw processor having fractional geometry in the granulation zone following specific embodiments with respect to granulation processes are within the scope of the disclosure.

In a specific embodiment, the disclosure relates to a method of granulation comprising the steps of:
 a) introducing an input blend comprising an active substance, binder, water and optionally an excipient into the intake zone of a fractional lobe processor;

b) passing the input blend through the granulation zone consisting of only fractional elements;
c) conveying the granules through a conveying zone comprising conveying elements towards the exit;
d) collecting the wet granules and drying them till a loss on drying below 1.5% w/w.

As used herein with respect to mean particle diameter, the term "significantly affected" means a change in mean particle diameter by less than 70 microns.

In an aspect, the disclosure relates to the method according to the preceding specific embodiment, wherein the mean particle diameter of dry granules obtained is not significantly affected by 4 times change in the feed rate.

In an aspect, the disclosure relates to the method according to the preceding specific embodiment, wherein the mean particle diameter of dry granules, is not significantly affected, after friability test followed by sieve analysis, as compared to the mean particle diameter of granules, before friability test followed by sieve analysis.

In an aspect, the disclosure relates to the method according to the preceding specific embodiment, wherein the median pore diameter (area) of dry granules is at least 6 times, that of granules produced under similar processing conditions and using a twin screw processor having a screw configuration which is devoid of elements having fractional geometry;
wherein the median pore diameter (area) is determined using a high pressure mercury porosity meter (Auto Pore IV 9500 V1.09-MICROMERITICS).

In an aspect, the disclosure relates to the method according to the preceding specific embodiment, wherein the average pore diameter of dry granules is at least 1.5 times that of granules produced under similar processing conditions and using a twin screw processor having a screw configuration which is devoid of elements having fractional geometry;
wherein the average pore diameter is determined using a high pressure mercury porosity meter (Auto Pore IV 9500 V1.09-MICROMERMCS).

In an aspect, the disclosure relates to the method according to the preceding specific embodiment, wherein the apparent skeletal density of dry granules is greater than that of granules produced under similar processing conditions and using a twin screw processor having a screw configuration which is devoid of elements having fractional geometry;
wherein the apparent skeletal density is determined using a high pressure mercury porosity meter (Auto Pore IV 9500 V1.09-MICROMERITICS).

In an aspect, the disclosure relates to the method according to the preceding specific embodiment, wherein the percent porosity of dry granules is greater than that of granules produced under similar processing conditions and using a twin screw processor having a screw configuration which is devoid of elements having fractional geometry;
wherein the percent porosity is determined using a high pressure mercury porosity meter (Auto Pore IV 9500 V1.09-MICROMERITICS).

In accordance with an embodiment, the powder material comprises moisture sensitive and/or heat sensitive ingredients.

In accordance with an embodiment, the powder material includes active ingredient(s) that may be selected from a group including foodstuffs, mineral ores, agricultural products (e.g. fertilizers), detergents, catalysts, chemicals, as well as biologically active ingredients. In accordance with an embodiment, biologically active ingredients include Active Pharmaceutical Ingredients (APIs) and ingredients for cosmetic, veterinary and for plant use.

In accordance with an embodiment, the API is selected from drugs belonging to various therapeutic categories such as antiinfectives, antibacterial agents, antihistamines and decongestants, anti-inflammatory agents, antiparasitics, antivirals, antifungals, amoebicidals, or trichomonocidal agents, analgesics, antiarthritics, antipyretics, antiasthmatic agents, anticoagulants, anticonvulsants, antidepressants, antidiabetics, antineoplastics, antipsychotics, antihypertensives, expectorants, electrolytes, laxatives, phytopharmaceuticals, muscle relaxants and diuretics. In accordance with an embodiment, the API can be a combination of two or more drugs. The amount of the API may vary depending on various factors, for example, the intended therapeutic application, the dosage form, dosage regimen, patient population etc. In accordance with some of the embodiments, the amount of API is suitably, one which provides the therapeutic dose approved by a regulatory agency, such as the USFDA.

In accordance with an embodiment, the powder material in addition includes binder(s) such as potato, wheat or corn starch, hydroxypropyl cellulose, hydroxyethyl cellulose; hydroxypropyl methylcellulose, polyvinylpyrrolidone (PVP), guar gum, pectin, gelatin, sodium alginate and the like suitable for pharmaceutical use. In accordance with a specific embodiment, the binder is a polyvinylpyrrolidone like PVP K30, PVP K90 and the like.

The amount of the binder(s) may depend on the type and amount of the API and other ingredients. In accordance with an embodiment, the amount of the binder(s) may range from 2.5% to 5%.

In accordance with an embodiment, the granules obtained by the process are mixed with conventionally known additives, modifiers or excipients and processed further into pharmaceutical dosage forms like tablets and capsules.

The one or more excipient(s) include any suitable pharmaceutically (or physiologically) acceptable excipients for use with the APIs such as conventionally used disintegrants, lubricants, sweeteners, flavoring agents, taste masking agents, diluents, glidants, wetting agents, effervescent acid-base couple, colorants, or combinations thereof.

Parameters like low residence time, low temperature within the processor and no requirement of a separate drying step for example, thermal or mechanical or di-electrical or supercritical or natural or convective drying make the disclosed processor and the process suitable for granulation of the mixture comprising moisture sensitive and/or heat sensitive ingredients.

The process has the ability to produce almost spherical and uniform granules directly without requiring a drying step outside the processor.

EXAMPLES

Example 1A

Quantitative Composition:

| Ingredients | % w/w |
| --- | --- |
| Metformin Hydrochloride | 95.0 |
| Polyvinylpyrrolidone (PVP K30) | 5.0 |

Metformin Hydrochloride and Polyvinylpyrrolidone were weighed and dispensed.

Metformin Hydrochloride was delumped and Polyvinylpyrrolidone was passed through mesh #40 and blended with Metformin HCl for about 5 minutes in a V-blender.

Processor: Omega 20P STEER Engineering Private Limited

Screw configuration for L/D 60:

| | | | | | | | Elements | | | | | | |
|---|---|---|---|---|---|---|---|---|---|---|---|---|---|
| CHS 15/15 | Spacer 7 mm | SSV 40/40 | 3RSE SSV40/20 | 3RSE 20/60 | 3RSE 30/60 | 3RSE 40/40 | 3DSA 40/40 | 3DSA 20/40 | 3DSA 40/40 | 3RSE 40/40 | 3RSE 30/60 | 3RSE 20/60 | 3RSE 30/60 |
| Number of elements 1 | 1 | 4 | 1 | 1 | 1 | 1 | 1 | 2 | 1 | 6 | 5 | 2 | 1 |
| | Intake zone | | | Conveying Zone | | | | Kneading zone | | Conveying and drying | | | |

Barrel Temperature Profile(° C.):

| | | | | | | Barrel No | | | | | |
|---|---|---|---|---|---|---|---|---|---|---|---|
| B1 | B2 | B3 | B4* | B5 | B6 | B7 | B8 | B9 | B10 | B11 | B12 |
| Temp (° C.) 30 | 30 | 30 | 30 | 30 | 30 | 100 | 100 | 100 | 100 | 100 | 100 |

*Water input using peristaltic pump

Processing Parameters: Feed rate—10.0 Kg/hour, Screw Speed—800 rpm, Fluid uptake—6-7% w/w
Results: Particle Size Distribution [Sieve No. (% Cumulative Weight Retained)]
30(17.71), #40(29.63), #60(54.94), #80(72.88), #100 (81.68), Median Diameter=300 microns
Parameters for Granules: Bulk density (g/cc)=0.416, Tapped Density (g/cc)=0.572, Compressibility index (%)=27.273, Hausner's Ratio=1.375, LOD (%)=1.01

Granules with drug loading 95% which were free flowing and highly compressible were obtained using fractional lobe processor Aspect Ratio:

Aspect ratio is the ratio of minimum diameter to maximum diameter. It quantifies the roundness of an object. An aspect ratio of 1 represents a circle.

Aspect ratio for the granules was calculated by using a Video Measuring System (VMS-3020F).

40 retains granules were taken and kept over the screen of VMS. The magnification was adjusted to get a clear image of the granule particle. The minimum and maximum diameter was measured using the digital ruler in VMS-3020F. The measurement was performed for around 20 particles. Also, images were captured for the same. The aspect ratio was then calculated using the minimum and maximum diameter values. % RSD was calculated and found to be within limits. Aspect ratio for individual particles was calculated and a mean aspect ratio of the 20 particles was calculated.

| ASPECT RATIO CALCUALTIONS FOR FLP METFORMIN HCL GRANULES | | |
|---|---|---|
| Minimum diameter (mm) | Maximum diameter (mm) | Aspect Ratio |
| 1.3 | 1.4 | 0.9 |
| 0.7 | 0.8 | 0.9 |

| ASPECT RATIO CALCUALTIONS FOR FLP METFORMIN HCL GRANULES | | |
|---|---|---|
| Minimum diameter (mm) | Maximum diameter (mm) | Aspect Ratio |
| 0.6 | 0.6 | 1.0 |
| 1.0 | 1.2 | 0.8 |
| 0.7 | 0.7 | 1.0 |
| 0.5 | 0.6 | 0.8 |
| 1.0 | 1.1 | 1.0 |
| 1.2 | 1.3 | 1.0 |
| 1.3 | 1.5 | 0.9 |
| 0.9 | 1.0 | 0.9 |
| 0.7 | 0.7 | 1.0 |
| 0.6 | 0.7 | 0.8 |
| 0.9 | 1.1 | 0.8 |
| 0.9 | 1.2 | 0.7 |
| 0.7 | 0.8 | 0.9 |
| 1.1 | 1.1 | 0.9 |
| 0.9 | 1.0 | 0.9 |
| 0.8 | 0.8 | 1.0 |
| 0.6 | 0.6 | 1.0 |
| 0.7 | 0.8 | 0.8 |
| Average 0.9 | 0.9 | 0.9 |
| Standard Deviation 0.2 | 0.3 | 0.1 |

The average aspect ratio is consistently observed to be between 0.8 to 1

Example 1B

Formula:

| Ingredients | % w/w |
|---|---|
| Metformin Hydrochloride | 97.0 |
| Polyvinylpyrrolidone (PVP K30) | 3.0 |

Metformin Hydrochloride and Polyvinylpyrrolidone were weighed and dispensed.

Metformin Hydrochloride was delumped and Polyvinylpyrrolidone was passed through mesh #40 and blended with Metformin HCl for about 5 minutes in a V-blender.

Processor: Omega 20P,

Screw configuration for L/D 60:

| CHS 15/15 | Spacer 7 mm | SSV 40/40 | 3RSE SSV40/20 | 3RSE 20/60 | 3RSE 30/60 | 3RSE 40/40 | 3DSA 40/40 | 3DSA 20/40 | 3DSA 40/40 | 3RSE 40/40 | 3RSE 30/60 | 3RSE 20/60 | 3RSE 30/60 |
|---|---|---|---|---|---|---|---|---|---|---|---|---|---|
| 1 | 1 | 4 | 1 | 1 | 1 | 1 | 1 | 2 | 1 | 6 | 5 | 2 | 1 |
| Intake zone | | | | Conveying zone | | | Kneading zone | | | Conveying and drying | | | |

Barrel Temperature Profile (° C.):

| Barrel No | | | | | | | | | | | |
|---|---|---|---|---|---|---|---|---|---|---|---|
| B1 | B2 | B3 | B4* | B5 | B6 | B7 | B8 | B9 | B10 | B11 | B12 |
| Temp (° C.) 30 | 30 | 30 | 30 | 30 | 30 | 100 | 100 | 100 | 100 | 100 | 100 |

*water input using peristaltic pump

Processing Parameters:

Feed rate—10.0 Kg/hour, Screw Speed—800 rpm, Fluid uptake—6-7% w/w

Results: Particle Size Distribution [Sieve No. (% Cumulative Weight Retained)]

30(20.34), #40(33.52), #60(59.77), #80(73.58), #100 (80.80), Median Diameter=330 microns Parameters for Granules:

Bulk density (g/cc)=0.415, Tapped Density (g/cc)=0.562, Compressibility index (%)=26.087, Hausner's Ratio=1.353, LOD (%)=1.06

Granules with drug loading 97% which were free flowing and highly compressible were obtained using fractional lobe processor Example 2: Wet Granulation

TABLE 4

Quantitative Composition for Metformin granules of Example 2

| S. No. | Ingredients | Quantity (% w/w) |
|---|---|---|
| 1. | Metformin Hydrochloride | 95.0 |
| 2. | Pregelatinized starch | 1 |

TABLE 4-continued

Quantitative Composition for Metformin granules of Example 2

| S. No. | Ingredients | Quantity (% w/w) |
|---|---|---|
| 3. | Polyvinyl pyrrolidone (PVP K90) | 2 |
| 4. | Polyvinyl pyrrolidone (PVP K30) | 1.3 |

Procedure:

Metformin Hydrochloride and other excipients were weighed and dispensed. Metformin Hydrochloride was passed through mesh #20 to remove any lumps. PVP K30, Pregelatinized starch and PVP K90 were passed through mesh #60 and added to Metformin Hydrochloride. It was blended for 2-3 minutes and stored in tightly closed polybags.

Processor Configuration:

Machine: Omega 20P, L/D: 60, FLE length=2.5%

Screw Configuration: Table 5 below gives the screw configuration of the processor for example 2.

TABLE 5

Screw configuration for Example 2

| | Elements | | | | | | | | | |
|---|---|---|---|---|---|---|---|---|---|---|
| | RSE 15/15 | NRF40/20 | RFV40/40 | RFN40/20 | RSE30/30 | RKB45/5/20 | FKB30/7/30 | RKB45/5/20 | RSE30/30 | RSE30/15 | RSE20/20 |
| Number of elements | 1 | 1 | 4 | 1 | 12 | 1 | 1 | 1 | 10 | 8 | 1 |
| | Feed intake zone | | | | $ | Granulation zone | | | Drying and discharge zone | | |

$ Conveying zone/water addition zone

List of Abbreviations for Elements

RSE—Right Handed Screw Element, RFV—Regular Flight Shovel Element, RFN—Regular Flight Shovel Element to Normal, NRF—Normal to RFV (transition element), RKB—Right handed Kneading block, FKB—Fractional Kneading Block Barrel Temperature (° C.):

Table 6 below gives the barrel temperature profile of the processor for Example 2.

TABLE 6

Barrel temperature profile for example 2

| Barrel No | B1 | B2 | B3 | B4 | B5 | B6 | B7 | B8 | B9 | B10 | B11 | B12 |
|---|---|---|---|---|---|---|---|---|---|---|---|---|
| Temp (° C.) | 30 | 30 | 30 | 30 | 30 | 30 | 30 | 30 | 80 | 80 | 80 | 80 |

Processing Conditions:

Feed rate: 150 g/minute; Screw speed: 500 rpm; Fluid uptake: 4.5 ml/minute

Results

1. Particle Size Distribution of Granules (Sieve No.; Cumulative Retained %):
   #20=25.40, #40=48.08, #60=60.97, #80=67.90, #100=74.23
2. Granule Properties:
   Bulk density (g/cc)=0.402; Tapped Density (g/cc)=0.566; Compressibility index (%)=28.986; Hausner's Ratio=1.408; Moisture by KF=0.9%

Observations:

Efficient granulation with drug loading as high as 95% can be performed with FLE(s) length of 2.5% in the granulation zone.

Example 3: Wet Granulation

TABLE 7

Quantitative Composition for Metformin granules of Example 3

| S. No. | Ingredients | Quantity (% w/w) |
|---|---|---|
| 1. | Metformin Hydrochloride | 95.67 |
| 2. | Pregelatinized starch | 1 |
| 3. | Polyvinyl pyrrolidone (PVP K90) | 0.5 |
| 4. | Polyvinyl pyrrolidone (PVP K90 + PVP K30) | 1.5 + 1.3 |

Procedure:

All the ingredients were weighed and dispensed. Metformin HCl was delumped by passing it through mesh #20. All other excipients were passed through mesh #60 and added to the delumped Metformin HCl. The mixture was blended for about 2-3 minutes and then fed into the twin screw processor.

Processor Configuration:

Machine: Omega 20P, L/D=60 (STEER, India),

Screw Configuration: Table 8 below gives the screw configuration of the processor for example 3.

TABLE 8

Screw configuration for Example 3

| Elements | | | | | | | | | | | | | | |
|---|---|---|---|---|---|---|---|---|---|---|---|---|---|---|
| CHS | Spacer 1 mm | SSV 40/40 | SSV 20/40 | 3RSE SSV40/20 | 3RSE 20/60 | 3RSE 40/40 | 3DSA 40/40 | 3DSA 20/40 | 3DSA 40/40 | 3RSE 40/40 | 3RSE 30/60 | 3RSE 20/60 | 3RSE 20/40 | 3RSE 20/60 |
| Number 15/15 | 1 | 4 | 2 | 1 | 2 | 1 | 1 | 1 | 1 | 4 | 5 | 2 | 1 | 1 |

CHS = Champer and Step

Barrel Temperature (° C.):

Table 9 below gives the barrel temperature profile of the processor for Example 3.

TABLE 9

Barrel temperature profile for Example 3

| | B1 | B2 | B3 | B4* | B5 | B6 | B7 | B8 | B9 | B10 | B11 | B12 |
|---|---|---|---|---|---|---|---|---|---|---|---|---|
| Temp (° C.) | 30 | 30 | 30 | 30 | 30 | 30 | 100 | 100 | 100 | 100 | 100 | 100 |

*Water was added at B4

Processing/machine Parameters: Screw Speed 800 rpm, Feed Rate 20 Hz (200.0 g/min), Fluid uptake 7% w/w
Results
1. Particle Size Distribution (Sieve No.; % Cumulative Weight Retained):
20=16.12, #40=49.77, #60=66.00, #100=76.27,
Median Diameter 430 microns
2. Granule Properties:
Bulk Density (g/cc)=0.500, Tapped Density (g/cc)=0.625, Compressibility Index (%)=20.00, Hausner's Ratio=1.25, Loss on Drying (% w/w)=1.06

Example 4

Comparative Evaluation of the Influence of Fractional-Lobed Geometry and Bi-Lobed Geometry (in the Screw Configuration of a Twin-Screw Processor) in a Water-Activated Granulation (Wet Granulation) Process on the Characteristics of Granules.

TABLE 10

Quantitative Composition for Metformin HCl Granules of Example 4

| S. No. | Ingredients | Quantity (% w/w) |
|---|---|---|
| 1. | Metformin HCl | 95 |
| 2. | Polyvinylpyrrolidone (PVP K30) | 5 |
| 3. | Purified Water IP* | 8 |

*Purified Water IP used as granulating fluid removed in the process of drying.

Procedure:

Granulation was performed using a 20 mm co-rotating twin screw processor (STEER) having a length to diameter ratio (L/D) of 9 and Do/Di of 1.71. Two main sets of trials were performed. One set of trials by using bi-lobed elements in kneading zone (30 mm) of the screw configuration (without any fractional elements) and at screw speed of 1000 rpm, referred herein below as BLP trials. Another set of trials by using fractional-lobed elements in kneading zone (30 mm) of the screw configuration and at screw speed of 1000 rpm, referred herein below as FLP trials.

Pre-wetted powder (8% w/w water) was fed using feeder into the barrel. It passed through the kneading zone of the barrel and wet granule mass was discharged. The wet granule mass was dried in a hot air oven at 50° C. till the LOD of 1.5% w/w. The dried granules were characterized for particle size, friability, morphology and porosity (using Micromeritics Auto Pore IV 9500 V1.09.

For each set of trials, the process was repeated at different feed rates of (30, 60 and 120 g/min) and corresponding populations of granules were collected. Thus, the trials carried out with bi-lobed elements in kneading zone of the screw configuration and at—a) feed rate of 30 g/min are designated as BLP 1, b) feed rate of 60 g/min are designated as BLP 2 and c) feed rate of 120 g/min are designated as BLP 3. Similarly, the trials carried out with fractional elements in kneading zone of the screw configuration and at—a) feed rate of 30 g/min are designated as FLP 1, b) feed rate of 60 g/min are designated as FLP 2 and c) feed rate of 120 g/min are designated as FLP3.

TABLE 11

Processing Parameters

| | BLP | | | FLP | | |
|---|---|---|---|---|---|---|
| Processing Parameters | BLP 1 | BLP 2 | BLP 3 | FLP 1 | FLP 2 | FLP 3 |
| Screw Speed (rpm) | 1000 | 1000 | 1000 | 1000 | 1000 | 1000 |
| Feed Rate (g/min) | 30 | 60 | 120 | 30 | 60 | 120 |

Figure 2:
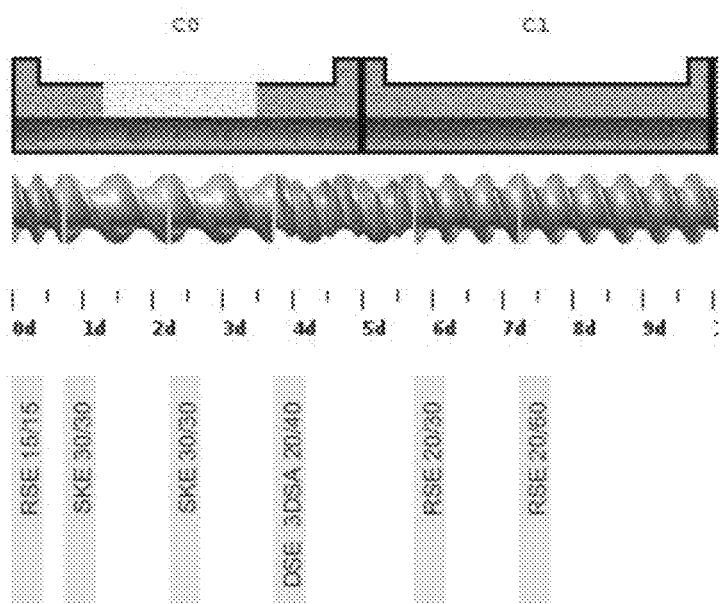
FIG. 2 illustrates screw configuration of a Fractional lobe processor in accordance with Example 4 of the present disclosure.

Table 12, FIG. 1 and Table 13, FIG. 2 exhibit the screw configurations for the BLP and FLP trials.

TABLE 12

Screw configuration for BLP trials

| Screw elements | RSE-15/15 (CBS) | SKE 20/60 | NKB90/5/30 | RSE 20/30 | RSE 20/60 |
|---|---|---|---|---|---|
| Nos. | 1 | 1 | 1 | 1 | 1 |

TABLE 13

Screw configuration for FLP trials

| Screw elements | RSE-15/15 (CHS) | SKE 20/60 | DSA 20/30 | RSE 20/30 | RSE 20/60 |
|---|---|---|---|---|---|
| Nos. | 1 | 1 | 1 | 1 | 1 |

RSE=Right handed screw element, NKB=Neutral Kneading Block, SK#-Schubkanten element, DSA=Dynamic Stir Element Comparison of Properties of Granules Obtained from BLP and FLP:

The wet mass from each trial was dried in a hot air oven at 50° C. till loss on drying was below 1.5% w/w. The dried granules were characterized for particle size and shape, friability, flow and porosity.

Granules of batch BLP1 and FLP 1 were lubricated with 0.5% Magnesium stearate and compressed into tablets on 11 mm circular die punch machine on Rotary Compression Machine at an average weight of 525 mg. The physical properties of the tablets were also evaluated.

1. Particle Size and Shape Analysis:

Granules were placed on a sieve shaker during 5 min at an amplitude of 2 mm using a series of sieves (150, 180, 250, 420, 600 and 850 gm). The amount of granules retained by each of the sieves was determined. Sieve analysis was performed using sieve shaker (Electrolab, India).

TABLE 14

Particle Size Distribution of Granules

| | | Cumulative % Retained | | | | | |
|---|---|---|---|---|---|---|---|
| | Sieve Size | Trial 1 | | Trial 2 | | Trial 3 | |
| S. No | (µm) | BLP 1 | FLP 1 | BLP 2 | FLP 2 | BLP 3 | FLP 3 |
| 1 | 850 | 35.83 | 21.65 | 48.38 | 23.96 | 44.74 | 28.14 |
| 2 | 600 | 44.42 | 29.53 | 60.44 | 32.51 | 52.78 | 37.86 |
| 3 | 420 | 52.28 | 36.66 | 67.77 | 44.92 | 59.9 | 48.64 |
| 4 | 250 | 65.85 | 50.9 | 78.14 | 57.45 | 71.4 | 60.89 |
| 5 | 180 | 74.5 | 64.85 | 83.98 | 65.92 | 77.4 | 74.08 |
| 6 | 150 | 81.69 | 80.73 | 85.57 | 80.84 | 83.5 | 83.91 |
| 7 | Fines | 16.42 | 19.27 | 15.41 | 19.16 | 16.42 | 17.09 |
| | D50 | 412 | 250 | 780 | 220 | 700 | 270 |

Figure 3:
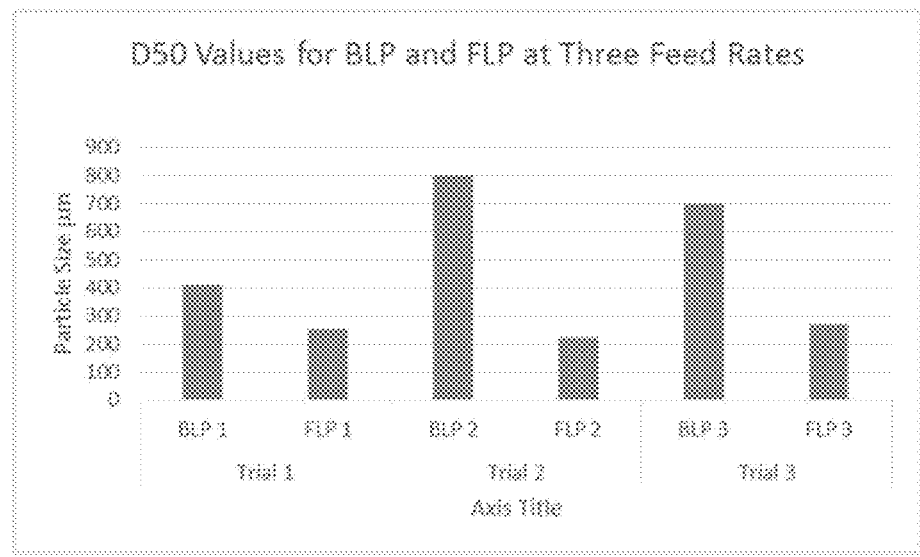
FIG. 3 illustrates the D50 values of the granules obtained from BLP (Bi-lobed processor) and FLP (Fractional lobe processor) trials in accordance with Example 4 of the present disclosure.

Observations:

D50 values of the granules obtained from BLP and FLP trials are displayed by FIG. 3. It was observed that the D50 value for the FLP is independent of the feed rate. Also, the BLP granules are distinctly bigger as compared to the FLP granules for all batches. Hence potential for over granulation is higher in BLP as compared to FLP. However, there is no significant difference in the fines indicating that the fraction of powder which is not granulated is not different in case of both geometries. Also, it was observed that the mean particle diameter of granules produced from FLP trials remained consistent and was not significantly affected by change in feed rate when compared to the granules produced from BLP trials.

Figures 4A, 4B:
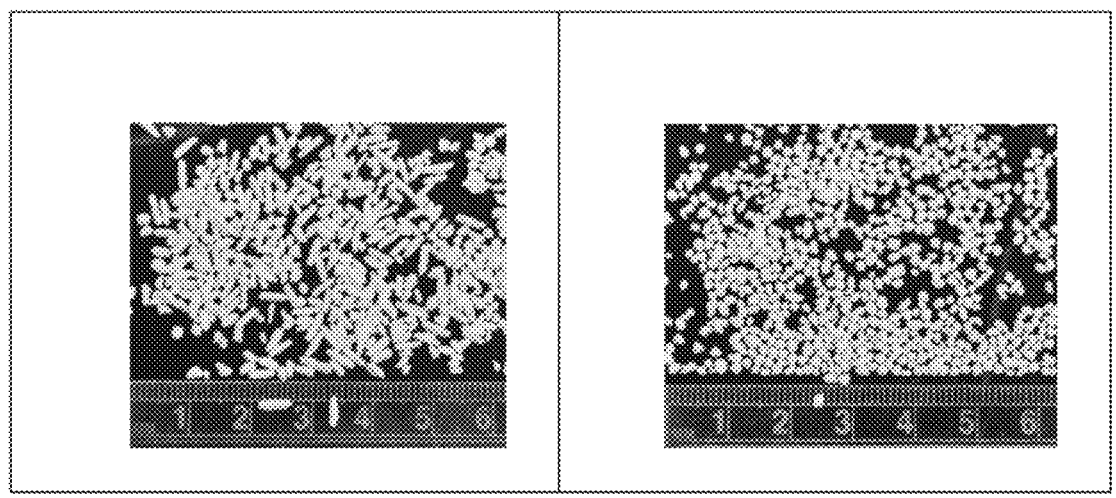
FIGS. 4A and 4B depict morphology of the granules greater than 850 μm obtained from BLP (Bi-lobed processor) and FLP (Fractional lobe processor) trials in accordance with Example 4 of the present disclosure.

To check morphology of the granules, the particles greater than 850 gm were isolated and photographed (FIGS. 4A and 4B). It is seen that, the granules of FLP trials produced using fractional geometry, have symmetrical morphology closer to spheroid, as compared to the elongated rod shape granules, of FLP trials produced using bilobed geometry.

2. Friability Test for Granules:

The tensile strength of the granules was determined by performing the friability on granules using Friabilator (Electrolab, India) and comparative sieve analysis before and after the test. The Friabilator was run at 25 rpm for 10 minutes by subjecting 10 grams of granules to falling shocks with 20 stainless steel beads (mean diameter 4 mm). The beads were then removed and the granules were subjected to sieve analysis.

Figure 5A:
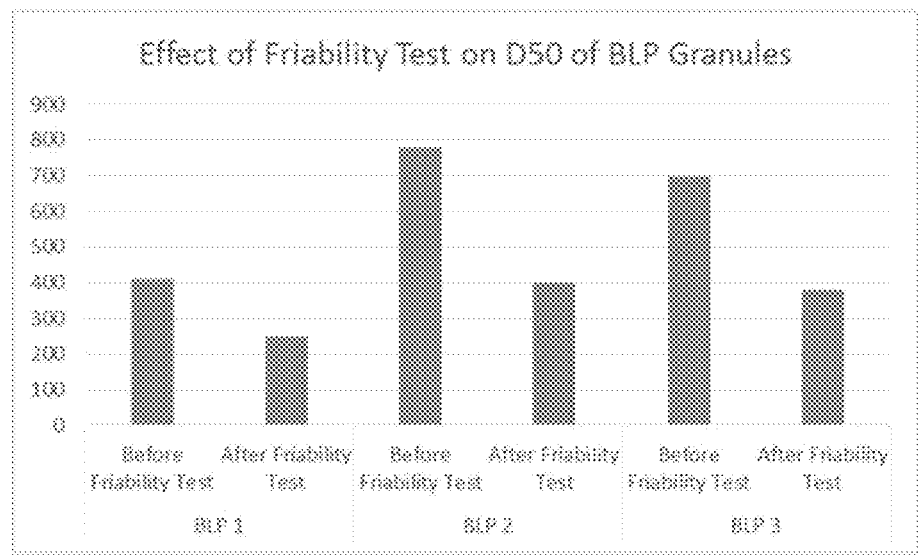
FIGS. 5A and 5B illustrate the effect of friability test on D50 values of the granules obtained from BLP (Bi-lobed processor) and FLP (Fractional lobe processor) trials in accordance with Example 4 of the present disclosure.
Figure 5B:
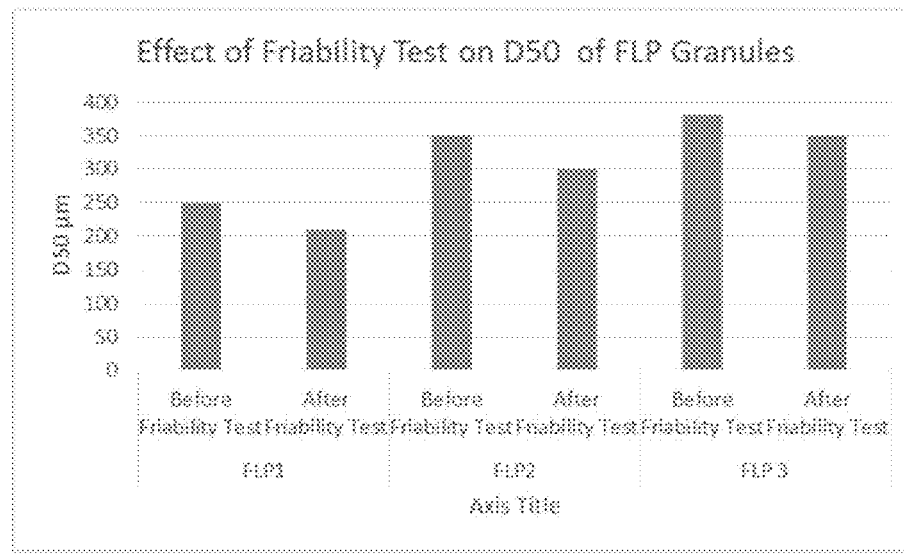

Observations:

FIGS. 5A and 5B illustrate the effect of friability test on D50 values of the particles obtained from the BLP and FLP trials. The better symmetry of the granules from FLP trials seems to be responsible for the significantly lower friability of the granules at the three different feed rates. There was a 25 to 30% reduction in the D50 value for the granules from BLP trials while in case of granules from FLP trials the reduction was significantly lower (10 to 15% reduction). This may be attributed to the symmetrical shape of FLP particles giving rise to inherently higher tensile strength.

3. Flow Properties:

The flow properties of the granules were measured in terms of the bulk density (BD), Tapped Density (TD), angle of repose, Hausner's Ratio (FIR) and the Carr's Index (CI).

TABLE 15

Flow Properties of BLP and FLP Granules

| Flow Property | BLP1 | BLP 2 | BLP 3 | FLP1 | FLP 2 | FLP 3 |
|---|---|---|---|---|---|---|
| Bulk Density | 0.47 | 0.45 | 0.51 | 0.51 | 0.55 | 0.54 |
| Tapped Density | 0.64 | 0.61 | 0.61 | 0.68 | 0.71 | 0.68 |
| Hausner's Ratio | 26.32 | 25.64 | 23.81 | 20.32 | 19.64 | 20.81 |
| Carr's Index | 1.36 | 1.35 | 1.31 | 1.26 | 1.25 | 1.21 |
| Angle of Repose | 36 | 33 | 30 | 23 | 22 | 24 |

Observations:

There is no significant difference in the bulk density values of granules from BLP and FLP trials. However, the angle of repose for granules from FLP trials is significantly lower than granules from BLP trials for all three batches. The lower angle of repose indicates better flow properties for FLP granules due to their spherical morphology.

4. Porosity

For the determination of porosity, granules from BLP1 and FLP1 trials were selected. These two batches had a similar particle size distribution. The granules of each batch were sized through a #40 sieve and the fraction retained on #60 sieve was subjected to porosity evaluation using the High-pressure mercury porosity meter (AutoPore IV 9500 V1.09, Micromeritics Instrument Corporation).

TABLE 16

Porosity of BLP and FLP Granules

| Parameter | Units | BLP 1 (420-250μ) | FLP 1 (420-250μ) | BLP 1 (841-420μ) | FLP 1 (841-420μ) |
|---|---|---|---|---|---|
| Total intrusion volume | mL/g | 1.3931 | 1.3443 | 0.9102 | 0.898 |
| Total pore area | m²/g | 0.237 | 0.141 | 0.234 | 0.126 |
| Median pore diameter (volume) | nm | 120815.5 | 102461.3 | 124983.1 | 120472.5 |
| Median pore diameter (area) | nm | 1347.5 | 9156.2 | 1343.6 | 9047.0 |
| Average pore diameter 4V/A | nm | 23559.1 | 38083.3 | 15544.6 | 28507.5 |
| Bulk density at 0.51 psia | g/mL | 0.4719 | 0.5235 | 0.6216 | 0.6371 |
| Apparent (Skeletal) Density | g/mL | 1.3774 | 1.7673 | 1,4314 | 1.489 |
| Porosity | % | 65.74 | 70.38 | 56.58 | 57.21 |

Observations:

It was observed that the median pore size, average pore diameter and apparent skeletal density values were significantly higher in granules obtained from FLP trials when compared to the granules from BLP trials. The Median pore diameter (area) of the granules obtained from FLP trials was increased by 6 times, average pore diameter by >50% and apparent skeletal density by >25%. The insignificant difference in % porosity needs further investigation to understand its relevance for differences observed with the granules' average pore diameter, skeletal density and median pore diameter.

5. Tablet Properties:

The tablets were evaluated for weight variation, hardness, friability and disintegration time.

Observations:

Tablets prepared from granules of BLP trials showed a significantly higher weight variation as compared to those prepared from the granules of FLP trials. This may be due to the irregular shape of the particles which visibly hampers the flow of the granules from the hopper. The granules from FLP trials exhibited tighter control over the weight variation and friability as compared to granules from BLP trials. This may be attributed to the better flow and larger pore diameter. The hardness and the friability of the tablets were not significantly different. The disintegration time of the tablets prepared from granules of FLP trials is marginally faster as compared to those prepared from the granules of BLP trials. This again may be attributed to the symmetrical shape of the granules.

Comparison of Torque During Processing of Granules in BLP and FLP Trials:

Torque Evaluation:

The torque during each of the trials was measured online every 0.5 seconds using an analogue torque acquisition system and analysed.

Figure 6:
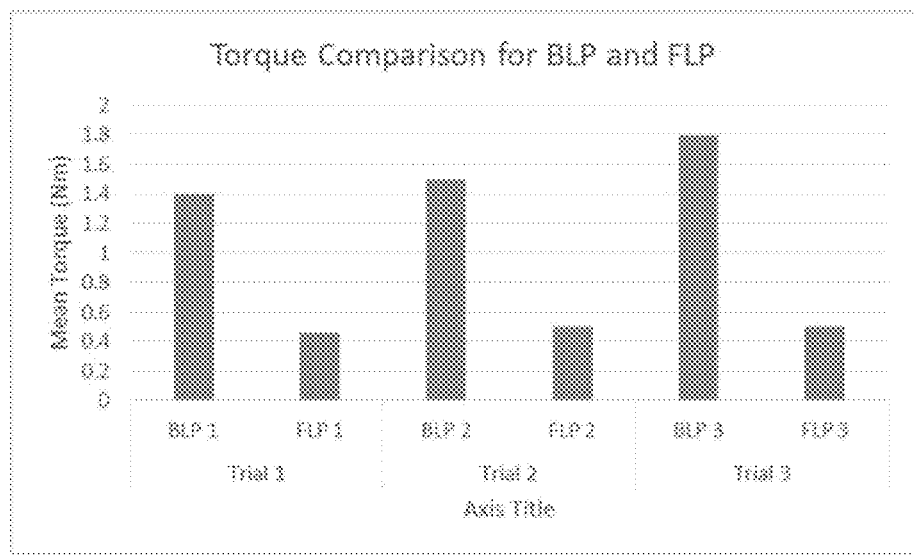
FIG. 6 depicts the mean torque in the BLP (Bi-lobed processor) and FLP (Fractional lobe processor) trials in accordance with Example 4 of the present disclosure.
Figure 7A:
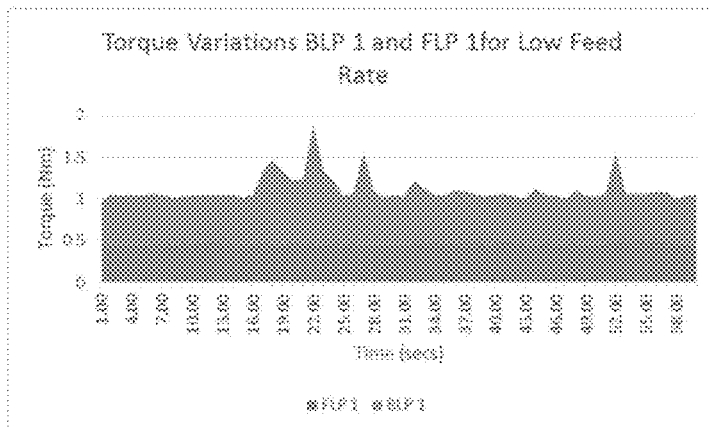
FIGS. 7A-7C depict the torque profiles in the BLP (Bi-lobed processor) and FLP (Fractional lobe processor) trials at three different feed rates in accordance with Example 4 of the present disclosure.
Figure 7B:
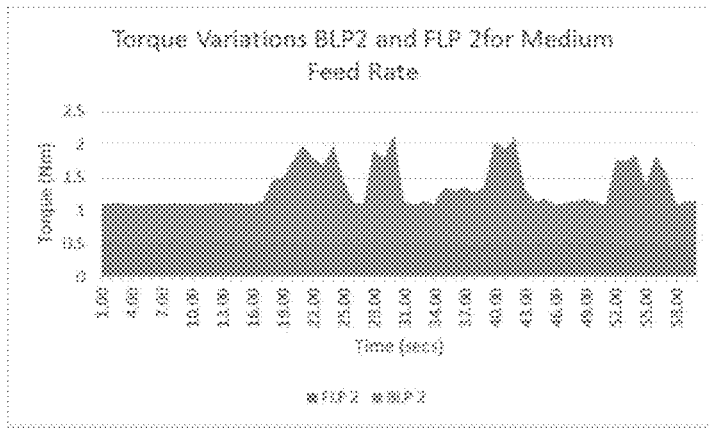
Figure 7C:
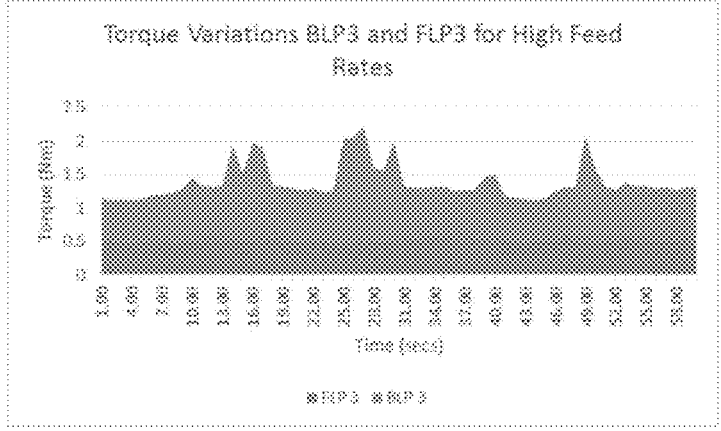

Observations:

The mean torque (FIG. 6) and torque profile (FIGS. 7A, 7B and 7C) in case of FLP trials at the three different feed rates earlier mentioned were found to be significantly lower compared to the BLP trials. It is observed that the steady state attained with fractional lobe geometry is more consistent without any sudden disturbances. The mean torque observed with fractional lobe geometry did not show any change with feed rate possibly due to no stagnation (absence of dead spots or hot spots).

To understand this further, mathematical simulation for both geometries (bilobed and fractional) was performed to map the pressure field using finite element models.

Mathematical Modeling:

Bi-lobe and Fractional lobe profiles of 10 mm thickness were considered for the numerical investigation forming the computational domain. These lobes were pivoted at the centers of two intersecting cylindrical bores which form the stationary walls in the modeling work. These lobes form the moving boundaries in the same direction about the pivoted point (co-rotation). Steady state analysis was carried-out with the orientation between the lobes being 45° and 90°.

Numerical simulation (ANSYS 16) using finite volume method for the discretization of the conservation laws in three dimension and the local balance was written on each discretized cell to establish the "control volume". The discretized cell was subjected to deformation using displacement diffusion equation.

Wall Shear Stress and Pressure fields in the form of color contours were captured for both BLP as well as FLP profiles. It was observed that the wall shear variation is more pronounced in the case of BLP perhaps the cause for torque variation. The pressure contours showed a significant asymmetry between the right and left sides.

Observations

Comparison of the torque parameters and the granule attributes for the BLP and FLP trials indicate the following:

1) FLP provides uniform torque demonstrating steady state across much wider range of through put.
2) More uniform work done has resulted in symmetrical shaped particle by FLP.
3) Better symmetry of particles has resulted in desirable attribute such as flow and friability.
4) A lower average torque translates into lower SME (Specific Mechanical Energy) which results into porous structure particularly.
5) Mathematical modelling indicates that the inconsistent torque in the BLP is due to high wall pressure indicating presence of hot spots.

INDUSTRIAL APPLICABILITY

The process and the processor disclosed provides an efficient, cost-effective continuous system for obtaining dry and uniform granules.

The process disclosed is scalable and suitable for rapid production of high volumes of uniform granules which are ready to be further processed into unit dosage forms like tablets and capsules.

Use of an optimal quantity of the fluid sufficient to granulate the powder material but not to over-wet it, combined with the twin screw processor configuration as disclosed provide uniform sized dry granules without requiring a separate drying and/or milling step. The granules obtained have desirable granule properties like ability to flow freely, compressibility, required particle size distribution and granule strength. The particle size distribution of the compounded output is controlled by positioning the FLE(s) suitably in the screw configuration as well as by varying the barrel temperature or screw speed.

Further, the disclosed process provides control over the ratio of granulating aid to the blend being granulated by introducing the fluid at a constant rate throughout the granulation process.

The processor provided is also suitable for high drug loading compositions. Due to efficient mixing capabilities of the FLE(s), compositions with high drug loading can be compounded with minimal amount of excipients, as low as below 5% w/w of the composition.

What is claimed is:

1. A method for granulating a pharmaceutical powder in a co-rotating twin screw extruder comprising separate zones within the co-rotating twin screw extruder including a conveying zone, a mixing zone, a granulating zone, a drying zone, and a discharging zone, the method comprising:
continuously introducing the pharmaceutical powder and a granulating fluid to the conveying zone of the co-rotating twin screw extruder followed by the mixing zone of the co-rotating twin screw extruder;
passing the pharmaceutical powder and the granulating fluid through the granulating zone of the co-rotating twin screw extruder to form wet granules;
passing the wet granules through the drying zone of the co-rotating twin screw extruder;
passing dried granules obtained from the drying zone through the discharge zone of the co-rotating twin screw extruder; and
continuously discharging the granules from the co-rotating twin screw extruder, wherein the co-rotating twin screw extruder is not a fluid bed processor, wherein the granulation zone and the drying zone of the co-rotating twin screw extruder include one or more fractional lobe elements, wherein the granulation zone is located upstream of the drying zone and the discharge zone and downstream of the mixing zone, and wherein each of mixing zone, the granulation zone, the drying zone, and the discharge zone are formed, separately, in order, by the co-rotating twin screw extruder.

2. The method of claim 1, wherein the pharmaceutical powder contains 0%, or less than 1%, or at least 1%, or at least 5%, or at least 10%, or at least 15%, or at least 20%, or at least 30%, or at least 40%, or at least 50%, or at least 60%, or at least 70%, or at least 80%, or at least 90%, or more than 95%, or more than 99%, of an active pharmaceutical ingredient.

3. The method of claim 2, wherein the pharmaceutical powder is a pure active pharmaceutical ingredient.

4. The method of claim 2, wherein the active pharmaceutical ingredient is selected from the group consisting of: antiinfectives, antibacterial agents, antihistamines, decongestants, anti-inflammatory agents, antiparasitics, antivirals, antifungals, amoebicidals, trichomonocidal agents, analgesics, antiarthritics, antipyretics, antiasthmatic agents, anticoagulants, anticonvulsants, antidepressants, antidiabetics, antineoplastics, antipsychotics, antihypertensives, expectorants, electrolytes, laxatives, phytopharmaceuticals, muscle relaxants, and diuretics.

5. The method of claim 2, wherein the pharmaceutical powder contains at least 2.5%-5% by weight of a granulation binder.

6. The method of claim 5, wherein the granulation binder is selected from the group consisting of: potato, wheat or corn starch, hydroxypropyl cellulose, hydroxyethyl cellulose, hydroxypropyl methylcellulose, polyvinylpyrrolidone, guar gum, pectin, gelatin, and sodium alginate.

7. The method of claim 1, wherein the granulating fluid is a solvent, or a mixture of solvents, that does not contain a dissolved polymer.

8. The method of claim 7, wherein the granulating fluid is water.

9. The method of claim 7, wherein the granulating fluid is steam added in a ratio from 2.5%-4% w/w of the pharmaceutical powder.

10. The method of claim 1, wherein the granulating fluid is a solution or a suspension of a granulating binder in water.

11. The method of claim 10, wherein the granulating binder is dissolved or suspended in the solution and is selected from the group consisting of: potato, wheat or corn starch, hydroxypropyl cellulose, hydroxyethyl cellulose, hydroxypropyl methylcellulose, polyvinylpyrrolidone, guar gum, pectin, gelatin, and sodium alginate.

12. The method of claim 1, wherein the discharged granules contain from 0.1%,-97.5% of an active pharmaceutical ingredient calculated on a dry basis.

13. The method of claim 7, wherein a ratio of granulating fluid to pharmaceutical powder is from 20% w/w-1% w/w.

14. The method of claim 13, wherein a moisture content of the discharged granules, as measured either by KF or by LOD, is less than 5%, less than 4%, less than 3%, less than 2%, less than 1%.

15. The method of claim 13, wherein a temperature in the drying zone is between 30-100 ° C.

16. The method of claim 1 wherein an aspect ratio of the discharged granules is in a range from 0.7-1.

17. The method of claim 1, wherein a mean diameter of the discharged granules (d50), as measured by sieving, varies less than 100 microns by a four-fold change in an overall powder feed rate when a liquid to solid w/w ratio is kept constant.

18. The method of claim 1, wherein a mean diameter of the discharged granules (d50), as measured by sieving varies less than 15% before and after friability testing in a Friabilator.

19. The method of claim 1, wherein the discharged granules are free flowing, as characterized by a Hausner ratio below 22%, and/or an angle of repose below 25 degrees, and/or a Carr Index below 1.3.

20. The method of claim 1, wherein the discharged granules are directly compressible.

21. The method of claim 10, wherein a ratio of granulating fluid to pharmaceutical powder is from 20% w/w-1% w/w.

22. The method of claim 21, wherein a moisture content of the discharged granules, as measured either by KF or by LOD, is less than 5%, less than 4%, less than 3%, less than 2%, less than 1%.

23. The method of claim 21, wherein a temperature in the drying zone is between 30-100° C.

24. The method of claim 21, wherein an aspect ratio of the discharged granules is in a range from 0.7-1.

25. The method of claim 21, wherein a mean diameter of the discharged granules (d50), as measured by sieving, varies less than 100 microns by a four-fold change in an overall powder feed rate when a liquid to solid w/w ratio is kept constant.

26. The method of claim 21, wherein a mean diameter of the discharged granules (d50), as measured by sieving varies less than 15% before and after friability testing in a Friabilator.

27. The method of claim 21, wherein the discharged granules are free flowing, as characterized by a Hausner ratio below 22%, and/or an angle of repose below 25 degrees, and/or a Carr Index below 1.3.

28. The method of claim 21, wherein the discharged granules are directly compressible.

\* \* \* \* \*